United States Patent

Richardson

[15] 3,639,841

[45] Feb. 1, 1972

[54] ELECTROMAGNETIC ENERGY DOSIMETER

[72] Inventor: Alfred W. Richardson, 318 Anthony Hall, Southern Illinois Universtiy, Carbondale, Ill. 62901

[22] Filed: Jan. 16, 1970

[21] Appl. No.: 3,366

[52] U.S. Cl. .............................. 325/363, 250/39, 325/364
[51] Int. Cl. .......................................................... H04b 1/00
[58] Field of Search .......................... 325/67, 149, 363, 364; 343/703, 841; 250/39 R; 324/72.5, 149

[56] References Cited

UNITED STATES PATENTS

| | | | |
|---|---|---|---|
| 3,063,010 | 11/1962 | Richardson | 325/364 |
| 2,811,624 | 10/1957 | Haagensen | 343/841 X |
| 2,437,876 | 3/1948 | Cohn | 325/364 |

OTHER PUBLICATIONS

Electronics World; June 1961, pp. 31– 33 & 79; " Detecting Microwave–Radiation Hazards," by Tom Jaski.

*Primary Examiner*—Benedict V. Safourek
*Attorney*—Koenig, Senniger, Powers and Leavitt

[57] ABSTRACT

Miniaturized dosimeter apparatus monitors the field density of radiated pulsed electromagnetic energy. An elongate cylindrical coil is used as a pickup and is positioned so that one-half of the coil protrudes from a small metallic case for the apparatus, providing uniform response substantially over a spherical angle of at least 180°. Means is interconnected with the coil for producing a periodic waveform having an average magnitude varying as a function of the field density of the radiated energy and having a period inversely proportional to the pulse repetition frequency of the energy. Means is responsive to this periodic waveform for providing a readily perceptible indication of the average magnitude of the periodic waveform whereby the field density of the radiated energy, and thereby the relative human thermogenic dosage thereof, is readily monitored.

11 Claims, 3 Drawing Figures

PATENTED FEB 1 1972

3,639,841

Alfred W. Richardson
Inventor.
Koenig, Senniger,
Powers and Leavitt
Attorneys.

ELECTROMAGNETIC ENERGY DOSIMETER

BACKGROUND OF THE INVENTION

This invention relates to apparatus for monitoring the field density of radiated pulsed electromagnetic energy and more particularly to such apparatus for providing readily perceptible visual or auditory indication of the field density of such radiated energy for monitoring the relative human thermogenic dosage of such energy.

Many situations occur where it is desired to know if human exposure to radiated electromagnetic radio frequency energy is dangerous. Many kinds of apparatus, such as certain types of radar, other microwave devices, including microwave ovens, and radio frequency transmitters radiate electromagnetic energy which has field density of sufficient magnitude that it is necessary to guard against human exposure to such radiation in order to insure that biological damage will not result from thermogenic heating within the human tissue and organs exposed thereto. While the extent of such heating is a function of both the field density of such radiated energy and the time of exposure thereto, a measure of the field density of such energy provides a relative indication of the human thermogenic dosage resulting from such exposure. For example, a maximum field density of radiated energy which is safe for human exposure has been established by the armed forces of the United States to be 10 milliwatts per square centimeter ($mW./cm.^2$), a figure which has been accepted by segments of both government and industry. Accordingly, a dosimetric indication of exposure to such microwave or other radio frequency energy may be given by apparatus which detects the field density of such energy and provides an indication of the field density with respect to such a predetermined maximum safe field density. Conventional radio field strength measuring apparatus is not useful for monitoring the overall field density of radiated electromagnetic energy to which there will be human exposure, since such apparatus is generally highly directional in nature and responsive only to a certain frequency or, at best, distinct bands of frequencies. Dosimeters have been proposed which simulate the actual heating effect, i.e., the thermogenic effect, on human tissue by actually measuring the temperature of a mass which behaves analogously to human tissue. While providing a cumulative indication of dosage, such apparatus is undesirably slow to respond and is therefore not quickly indicative of high field density levels of radiated energy. Other proposed types of dosimeters measure the actual field density of radiated energy, but have generally been found to be undesirable because of inaccuracy, sensitivity only to limited frequencies, or because their pickup arrangement is directional in character or has nulls or other nonuniform receptive qualities. Such devices must therefore be aimed or carefully aligned with respect to the source of the energy. The latter disadvantage particularly greatly detracts from the practicality and usefulness of such devices. The resultant lack of confidence in the indicated radiation level further compromises the use of such prior art devices. Another disadvantage of dosimeters of the prior art has been their lack of suitability for being conveniently carried by a person without interfering with his other duties. For example, such devices have not been suited for being carried in a pocket or on one's belt. Disadvantageously, these prior art devices have typically been relatively large, complicated, and accordingly, expensive.

SUMMARY OF THE INVENTION

Among the several objects of the invention may be noted the provision of dosimeter apparatus for monitoring the field density of radiated pulsed electromagnetic energy; the provision of such apparatus which provides a readily perceptible indication of the field density of such energy with respect to a predetermined maximum field density which is safe for human exposure; the provision of such apparatus which is uniformly responsive to radiated energy substantially over a spherical angle of greater than 180° thereby being essentially nondirectional in use; the provision of such apparatus which is highly sensitive to radiated radio frequency energy over a wide frequency spectrum; the provision of such apparatus which is extremely small in size, reliable in operation, relatively simple, and inexpensively constructed. Other objects and features will be in part apparent and in part pointed out hereinafter.

Briefly, dosimeter apparatus of the present invention monitors the field density of radiated pulsed electromagnetic energy. The apparatus is provided with a pickup which is responsive to the radiated energy and which is constituted by an elongate cylindrical coil having a plurality of turns of wire spaced uniformly along the length thereof. Means is provided, preferably a metallic closure for the apparatus, for electromagnetically shielding half the length of the coil beginning at one end thereof. Thus the radiation pattern of the coil is such that the coil is uniformly responsive to the radiated energy substantially over a spherical angle of at least 180°, i.e., 360° in a horizontal plane and at least 180° in a vertical plane. Means is interconnected with the coil for producing a periodic waveform having an average magnitude which varies as a function of the field density of the radiated energy and having a period which is inversely proportional to the pulse repetition frequency thereof. Finally, means is responsive to this periodic waveform for providing a readily perceptible indication of the average magnitude of the periodic waveform. In this way, the field density of said radiated energy, and thereby the relative human thermogenic dosage thereof, is readily monitored.

BRIEF DESCRIPTION OF THE DRAWINGS

Corresponding reference characters indicate corresponding parts throughout the several views of the drawings.

DESCRIPTION OF THE PREFERRED EMBODIMENTS

Figures 1, 2, 3:
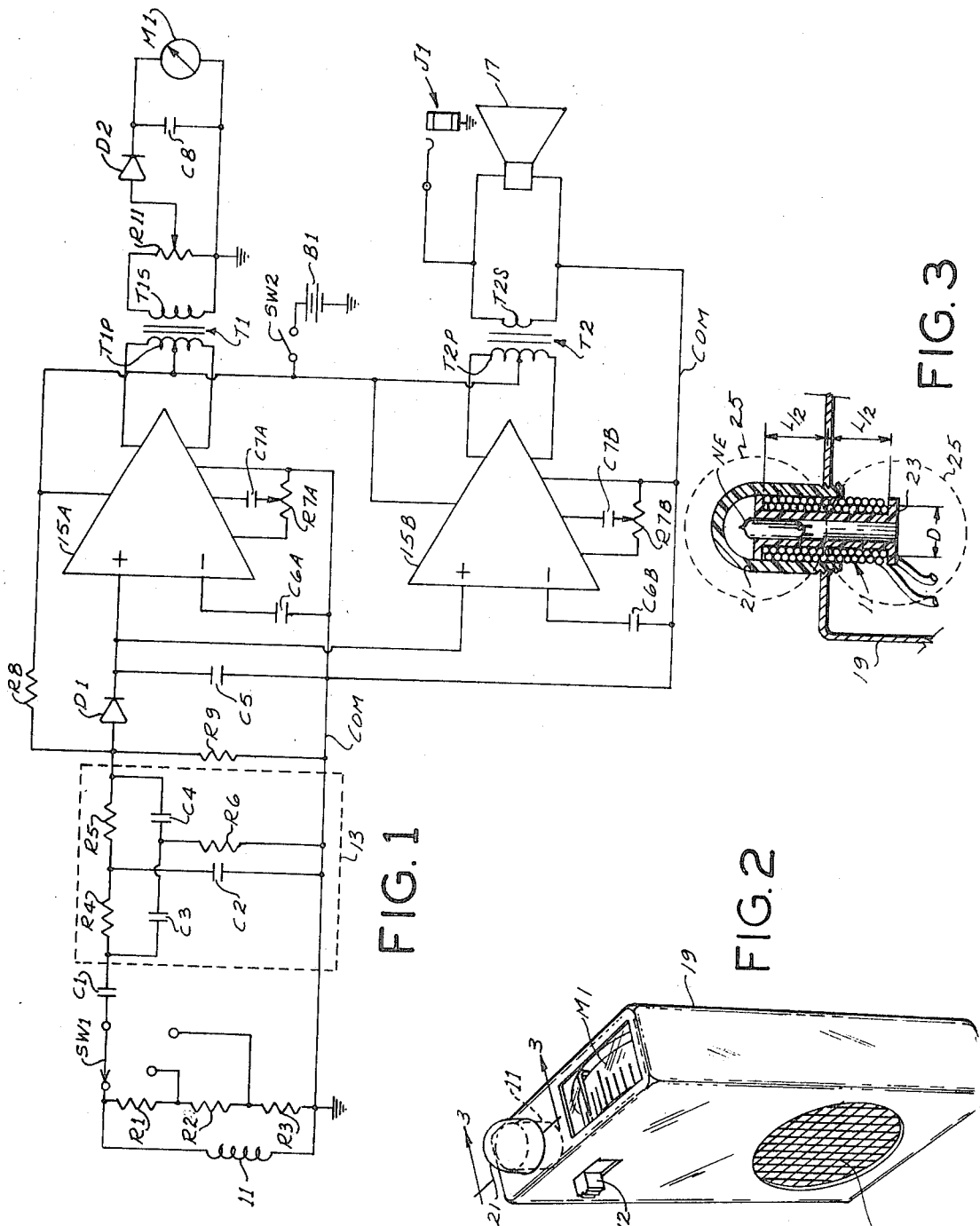
FIG. 1 is a schematic circuit diagram of dosimeter apparatus of the present invention.
FIG. 2 is a view in perspective of a miniaturized dosimeter of this invention.
FIG. 3 is a section, taken along line 3—3 of FIG. 2, of a pickup assembly of the dosimeter of FIG. 2 also representing graphically the radiation pattern of the pickup.

Referring now to the drawings, and more particularly to FIG. 1, a schematic circuit diagram illustrates circuitry of dosimeter apparatus of the present invention which is adapted to monitor the field density of radiated pulsed electromagnetic energy, i.e., radiofrequency energy which is transmitted with a pulsed characteristic and which therefore has a pulse repetition frequency. Such energy is radiated, for example, in the operation of radar systems.

The apparatus includes a pickup coil 11, described in greater detail hereinbelow, which is responsive to the radiated energy. One side of coil 11 is connected to a circuit ground or common COM. A voltage divider comprising three series-connected resistors R1, R2 and R3 is connected across coil 11, one side of each of the resistors being connected to a respective tap of a selector switch SW1 permitting selection of three ranges of sensitivity of the apparatus. The input signal is provided through a capacitor C1 to a notch filter indicated generally at 13. Capacitor C1, it should be understood, is relatively large with respect to the frequencies picked up by coil 11 and is thus not employed in any sense for tuning purposes but rather for isolating coil 11 from a DC biasing voltage described hereinafter and to prevent any coupling of low frequencies from coil 11 into the apparatus because of the time constant it provides. Thus coil 11 may be said to be connected in an untuned circuit.

Notch filter 13, which is optional, is of a parallel-T configuration with a first T including a pair of resistors R4 and R5 and a capacitor C2 and a second T having a pair of capacitors C3 and C4 and a resistor R6. Notch filter 13 is adapted to shunt any signal picked up at a preselected notch rejection frequency determined by the value of the components of the notch filter. This preselected frequency may, for example, be 60 Hz.

or 400 Hz., these frequencies being characteristic of conventional AC power sources used for powering apparatus whose transmitted output is being monitored by a dosimeter of this invention. For example, 400 Hz. power is used for powering military radars and the various power connections incidental to such equipment are likely to generate electromagnetic fields at this frequency. It is desired that the present dosimeter not be responsive, therefore, to such a power frequency.

The input signal passed through notch filter 13 is rectified by a diode D1 and applied across a capacitor C5, one side of the latter being connected to the circuit common COM. The rectified signal across capacitor C5 is supplied to the noninverting input, indicated by a plus sign, of a differential amplifier 15A and also to the similarly indicated noninverting input of another differential amplifier 15B. Each of amplifiers 15A and 15B is preferably a monolithic operational amplifier of the linear integrated circuit variety available from a number of sources. Such a device, by virtue of its extremely small size, contributes to miniaturization of the present dosimeter apparatus. In order to insure accuracy and overall satisfactory performance, it is preferred that each of amplifiers 15A and 15B exhibits relatively good performance. For example, the amplifiers should have good linearity to insure accuracy and should have relatively high open-loop gain to insure sensitivity. In a practical embodiment of this dosimeter, it was found that satisfactory performance was obtained by using for each of amplifiers 15A and 15B an RCA-CA3020 integrated circuit combined preamplifier-driver.

The inverting input, designated with a minus sign, of each of amplifiers 15A, 15B is connected to the circuit common COM through a respective capacitor C6A, C6B to provide each of the amplifiers with temperature stabilization and current compensation. A gain control for each of the amplifiers is provided by means of a respective potentiometer R7A, R7B whose wiper is connected through a respective capacitor C7A, C7B to permit variation in the level of the signal coupled between preamplifier and amplifier stages within amplifiers 15A, 15B per se, as is conventional.

Each of amplifiers 15A, 15B has a differential output connected to the respective primary winding T1P and T2P of a pair of transformers T1 and T2, each of these primary windings having a center tap to which power is provided from a battery B1 of suitable voltage upon the closure of a switch SW2, this voltage also being supplied to respective supply terminals for amplifiers 15A, 15B, as indicated, as well as to a biasing circuit. The latter biasing circuit includes a pair of resistors R8 and R9. The junction of these two resistors is connected to the anode of diode D1 and thus provides a predetermined bias voltage to the noninverting inputs of amplifiers 15A, 15B. The secondary winding T1S of transformer T1, preferably having the same number of turns as primary winding T1P, is connected across a potentiometer R11 whose wiper is connected through a diode D2 to a capacitor C8. A suitable meter M1 is connected across the capacitor to provide an indication of the voltage thereacross. Connected across the secondary winding T2S of transformer T2, which is an impedance-matching stepdown transformer, are a miniature loud speaker 17 or other suitable transducer and a jack J1, the latter providing for connection of a tape recorder, or other means for external monitoring, to the dosimeter.

The circuitry thus described is enclosed within a metallic case or enclosure 19, as illustrated in FIG. 2. Case 19 is preferably approximately the size of a cigarette package so that it may be readily held in the hand or carried in a pocket. For example, according to one practical embodiment, case 19 had a width of about 2½ inches. It is found that a case of this size is also highly desirable because it does not cause disturbance or aberrations in the pickup characteristics of coil 11. It has been found that large enclosures sometimes cause wave reflections and offer other disturbances which are detrimental to performance. Preferably, the corners of case 19 are rounded somewhat to prevent undesirable reflections or other effects on performance of pickup coil 11. Pickup coil 11 is covered by a translucent plastic cover 21 which protrudes from the top of case 19. Cover 21 provides damage and moisture protection for coil 11 without affecting its pickup characteristics.

FIG. 3 shows in detail the preferred arrangement for pickup coil 11. As illustrated therein, coil 11 is of elongate cylindrical form having a relatively high number of turns of wire which preferably are linearly wound on a nonmagnetic air core coil form 23 so that the turns of wire are spaced uniformly along the length of the coil. In accordance with this invention, coil 11 is positioned within the case 19 so that substantially exactly half the length of the coil, L/2, protrudes from case 19. This provides electromagnetic shielding of half the length of coil 11 beginning at one end thereof. By virtue of its elongate form, coil 11 has a length L substantially greater than its diameter D. In a vertical plane, i.e., a plane in which lies the longitudinal central axis of coil 11, the coil, if unshielded, would have a radiation pattern, and therefore a receiving pattern, which is shaped like a figure 8. The pattern is represented accordingly in FIG. 3 as a dashed line designated 25. However, because half of the length of the coil, i.e., L/2, is electromagnetically shielded by metal case 19, the radiation pattern in a vertical plane comprises only the circular top portion of figure 8 pattern 25. In the horizontal plane, i.e., the plane normal to the longitudinal central axis of coil 11, the pattern is circular and thus is substantially exactly uniform over 360° of the plane. In the vertical plane, coil 11 is uniformly responsive over somewhat greater than 180°. The effect of this is to provide coil 11 with uniform responsivity to the radiated pulse energy substantially over a spherical angle of somewhat more than 180°. As a result of this uniform responsivity, high accuracy is obtained. A practical example of coil 11 which gave satisfactorily uniform and accurate performance had a length L of 1¼ inches and a diameter D of ¼ inch. The coil was constituted by 4,400 turns of wire linearly wound on form 23. Such a relatively large number of turns provides the coil with high pickup sensitivity.

In general, it is desired that the length of coil 11 be substantially greater than the diameter to insure that the radiation pattern in a vertical plane is essentially a perfect circle. As will be appreciated from the foregoing, positioning of coil 11 in the above manner insures that there are no exposed null points in the radiation pattern other than when coil 11 is aimed directly away from the source of the radiated energy, i.e., when the bottom of the dosimeter is toward the source of energy.

Means for insuring that the user of the dosimeter will not be exposed to excessive radiation levels because of inoperation or malfunctioning of the dosimeter is provided by the inclusion of a neon bulb NE within coil cover 21. The hollow coil form 23 readily receives bulb NE, as illustrated, so that the bulb is exposed to radiation regardless of whether the dosimeter circuitry per se functions or not. Should bulb NE be exposed to a field density in excess of a predetermined threshold value, e.g., 20–25 mW./cm.$^2$, causing ionization of the neon gas in the bulb, a glow indication will be provided which is visible through cover 21, thus altering the user that he is being exposed to a radiated field density which is unsafe for further exposure. Other gas-filled cold cathode glow-discharge devices may be used in place of neon bulb NE.

In operation, it is assumed that the dosimeter is positioned with respect to the source or sources of pulsed magnetic energy whose radiated energy is desired to be monitored so that the source of radiated energy is within the hemisphere of uniform sensitivity represented by the top half of radiation pattern 25. This would occur, for example, if the dosimeter in the form illustrated in FIG. 2 were carried by a person in a vertical position in his shirt pocket and the source or sources are any appreciable distance horizontally, i.e., a few feet from the user or are somewhat above the user. As is apparent, accurate sensing also results if the dosimeter is oriented so that the plastic cover 21 over coil 11 is pointed in the general direction of the source of energy. Switch SW1 is positioned so that it is set to a suitable sensitivity range, it being understood that resistors R1, R2 and R3 are chosen to provide sensitivity ranges of interest, e.g., 1, 10, and 100 mW./cm.². It is assumed that gain control potentiometer R7A and meter potentiometer R11 are set to provide meter M1 with a half-scale reading of 1, 10 and 100 mW./cm.², respectively as to the three ranges. Thus, on the 10 mW./cm.² scale, a half-scale reading of meter M1 represents a predetermined maximum field density of the radiated energy which is safe for human exposure.

The calibrated apparatus thus properly oriented, coil 11 picks up radiated energy and a voltage is therefore developed thereacross which varies according to the field density of radiated pulsed energy to which the user is exposed. The signal across coil 11 is applied through capacitor C1 to the optional notch filter 13 which (if present) filters out any signal energy at the preselected notch frequency determined by the values of the filter components and thus prevents such energy from being supplied to those portions of the circuitry which provide indication of the field density level of radiated energy. The pulsed radiofrequency energy passed through filter 13 is rectified by diode D1 and integrated by capacitor C5. The radiofrequency component of the signal thus applied by diode D1 to capacitor C5 is shunted to the circuit common COM through capacitor C5. As a result of integration by capacitor C5, there is developed thereacross a periodic waveform having an average magnitude which varies as a function of the field density of the radiated energy and which has a period which is inversely proportional to the pulse repetition frequency of the radiated energy. This periodic waveform varies substantially according to a sawtooth or triangular characteristic and is applied to the noninverting input of amplifier 15A. The amplified sawtooth waveform is supplied to the primary winding T1P of transformer T1. The resultant voltage across the secondary winding T1S is applied through the tap of potentiometer R11 through diode D2, which rectifies this voltage and applies it to a capacitor C8. This capacitor serves as a second integrating means which integrates the amplified waveform applied thereto to produce a voltage varying substantially according to the field density of the radiated energy. Meter M1 indicates this voltage and thus provides a readily perceptible indication of the average magnitude of the sawtooth waveform across capacitor C5. In this way, the meter provides a visual indication of the field density of the radiated energy.

The sawtooth waveform across capacitor C5 is also applied to the noninverting input of amplifier 15B which amplifies the waveform and applies it to the primary winding T2P of transformer T2. The signal across the secondary winding T2S is supplied to loud speaker 17 thus providing an audio signal whose frequency is the same as the pulse repetition frequency of the radiated energy. In this way, a readily perceptible audio signal is provided for auditory indication of the field density of the radiated energy. It should be pointed out that this audio signal is not provided only when a predetermined maximum field density is picked up by coil 11 but instead is continuously proportional to the field density.

Neon bulb NE functions to provide an indication if the field density of the radiated energy to which the dosimeter, and thereby neon bulb NE, is exposed reaches a predetermined value causing ionization of the neon gas in the bulb. Accordingly, the neon bulb will fire at this energy level, e.g., 20–25 mW./cm.² as noted previously, and thus will provide a standby warning which will alert the user of the dosimeter that he is being exposed to a level of radiation which is unsafe for continued human exposure. This will occur even if the dosimeter is miscalibrated, is otherwise inoperative or, for example, if it was forgotten to turn on the dosimeter by closing switch SW2.

As will have been appreciated by those skilled in the art, the dosimeter apparatus of the present invention is operative as a detector for or monitor of the radiation level of pulsed radio frequency electromagnetic radiated energy, including energy at microwave frequencies, such radiofrequency energy being thermogenic in nature. However, the dosimeter does not respond to other forms of energy, such as gamma rays, ultraviolet radiation, visible light, or infrared radiation. Since pickup coil 11 does not provide a tuned input and therefore does not have a high "Q" ordinarily associated with a tuned circuit, the apparatus is not responsive to merely a distinct band or bands of frequencies, but it is instead responsive to radio frequency energy over a wide frequency spectrum. Further, the dosimeter is small in size and quite simple in design and is therefore inexpensively constructed.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Dosimeter apparatus for monitoring the field density of radiated pulsed electromagnetic energy comprising:
   a pickup responsive to said radiated energy, and constituted by an elongate cylindrical coil having a plurality of turns of wire spaced uniformly along the length thereof;
   means for electromagnetically shielding approximately half said length of the coil beginning at one end thereof, whereby said coil is uniformly responsive to the radiated energy substantially over a spherical angle of at least 180°;
   means interconnected with said coil in an untuned circuit for producing a periodic waveform having an average magnitude which varies as a function of the field density of said radiated energy and having a period which is inversely proportional to the pulse repetition frequency thereof;
   means responsive to said periodic waveform for providing a readily perceptible indication of the average magnitude of said periodic waveform whereby the field density of said radiated energy, and thereby the relative human thermogenic dosage thereof, is readily monitored.

2. Dosimeter apparatus as set forth in claim 1 wherein said means for electromagnetically shielding a portion of said coil comprises a metallic enclosure for said apparatus and substantially exactly half the length of said coil protrudes from said enclosure.

3. Dosimeter apparatus as set forth in claim 1 wherein said means for producing a periodic waveform comprises means for integrating said radiated energy whereby said periodic waveform varies substantially according to a sawtooth characteristic.

4. Dosimeter apparatus as set forth in claim 3 wherein said means responsive to said periodic signal comprises a first linear differential amplifier for amplifying said periodic waveform and means for integrating said amplified waveform to produce a voltage varying substantially according to the field density of said radiated energy.

5. Dosimeter apparatus as set forth in claim 4 further comprising a meter for indicating said voltage to provide a visual indication of the field density of said radiated energy.

6. Dosimeter apparatus as set forth in claim 5 wherein said meter is calibrated to a predetermined maximum field density of said radiated energy which is safe for human exposure.

7. Dosimeter apparatus as set forth in claim 3 wherein said means responsive to said periodic waveform comprises a second linear differential amplifier for amplifying said periodic waveform to produce an audio signal providing for auditory indication of the field density of said radiated energy.

8. Dosimeter apparatus as set forth in claim 7 further comprising a transducer interconnected with said second amplifier and giving auditory indication of the field density of said radiated energy.

9. Dosimeter apparatus as set forth in claim 2 further comprising a gas-filled cold cathode glow-discharge device protruding from said enclosure for providing a glow indication when said field density reaches a predetermined value causing ionization of the gas in said device.

10. Dosimeter apparatus as set forth in claim 9 wherein said glow-discharge device comprises a neon bulb.

11. Dosimeter apparatus as set forth in claim 1 further comprising a notch filter interconnection said pickup and said means for producing a periodic signal, said filter being adapted to prevent electromagnetic fields substantially at a preselected frequency picked up by said pickup from being supplied to the last said means.

* * * * *